June 10, 1924.
M. E. PITTMAN
1,497,225
PORTABLE ENGINE TESTING INSTRUMENT
Filed Oct. 14, 1922     2 Sheets-Sheet 1
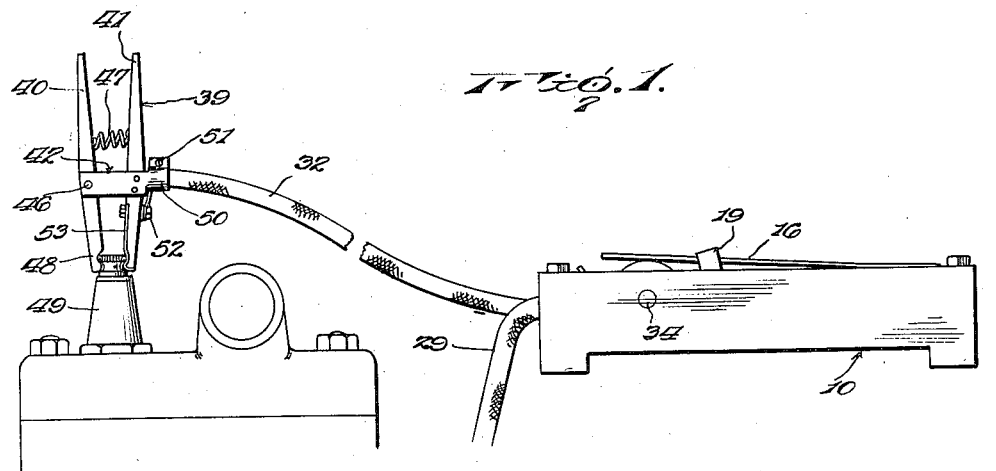
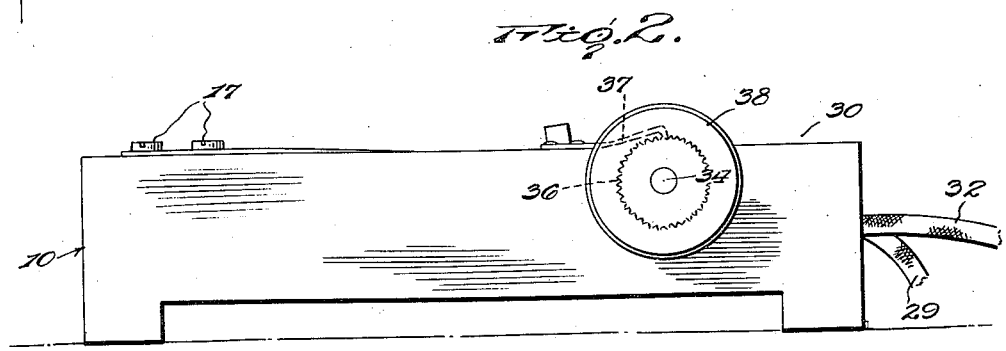
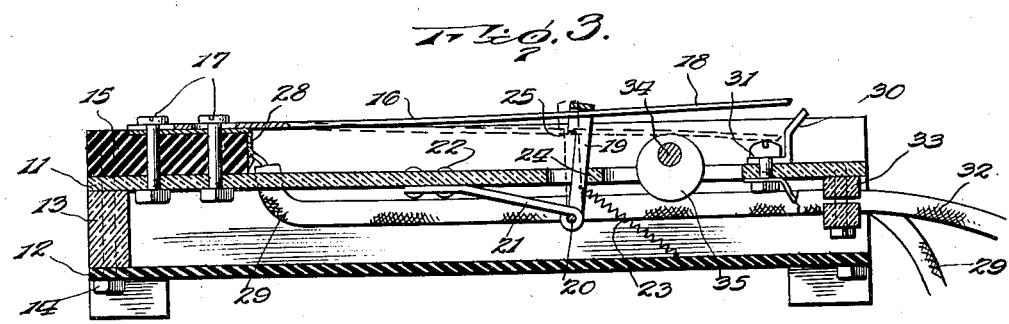
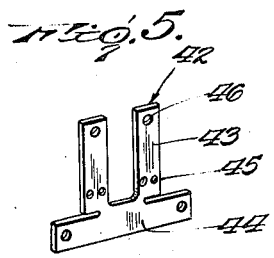
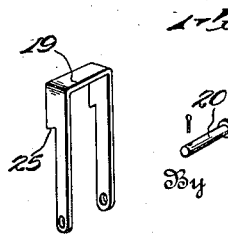
Inventor
M. E. Pittman.
By Lacey & Lacey, Attorneys June 10, 1924.
M. E. PITTMAN
PORTABLE ENGINE TESTING INSTRUMENT
Filed Oct. 14, 1922   2 Sheets-Sheet 2
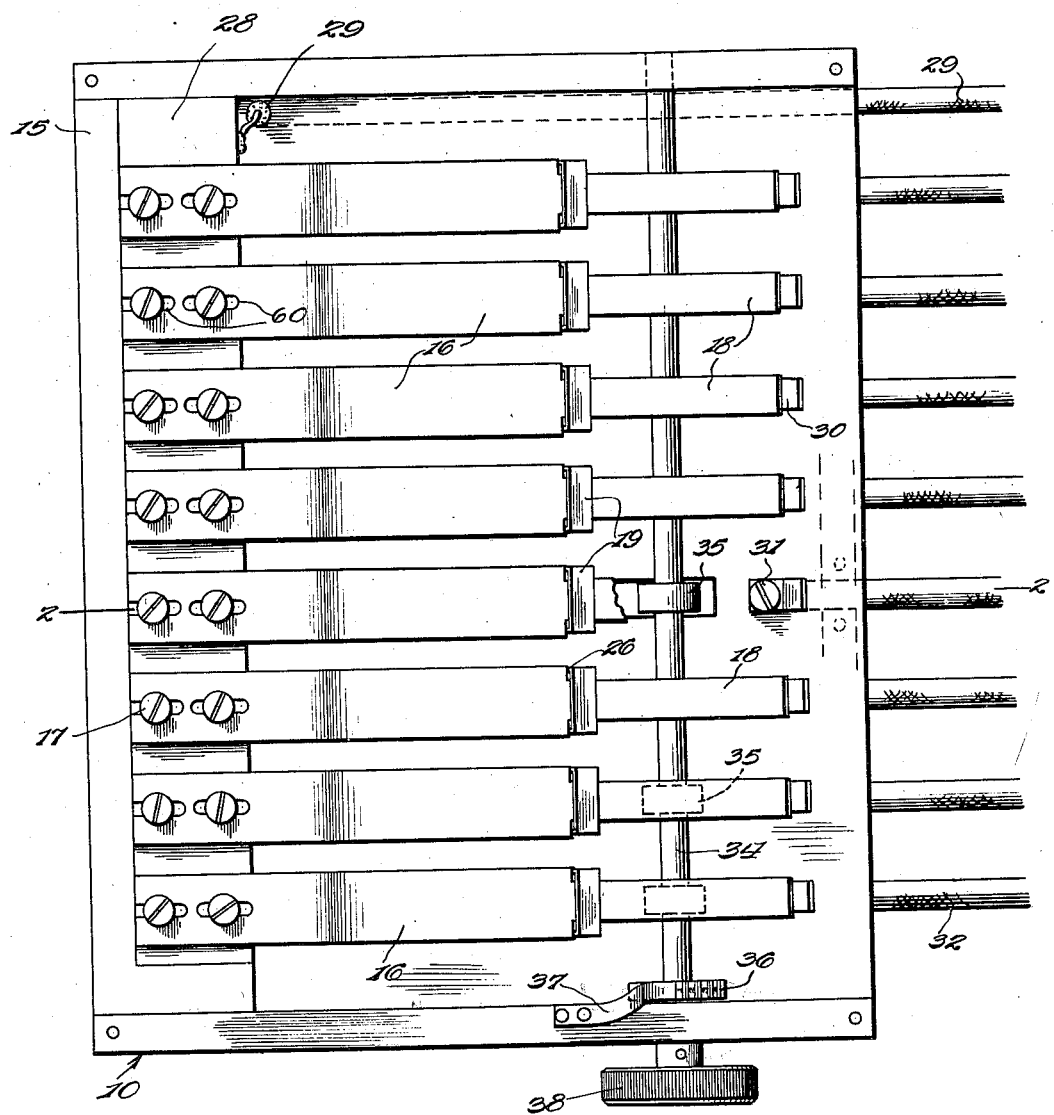
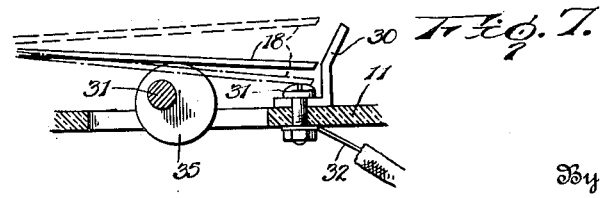
Inventor
M. E. Pittman.
By Loyd Lacey, Attorneys Patented June 10, 1924.

1,497,225

UNITED STATES PATENT OFFICE.

MORDAUNT E. PITTMAN, OF AMARILLO, TEXAS, ASSIGNOR OF ONE-HALF TO WILLIAM D. BURGER, OF AMARILLO, TEXAS.

PORTABLE ENGINE-TESTING INSTRUMENT.

Application filed October 14, 1922. Serial No. 594,481.

*To all whom it may concern:*

Be it known that I, MORDAUNT E. PITTMAN, a citizen of the United States, residing at Amarillo, in the county of Potter and State of Texas, have invented certain new and useful Improvements in Portable Engine-Testing Instruments, of which the following is a specification.

The present invention relates to an instrument for testing multiple cylinder, internal combustion engines having electric ignition and more particularly engines of this class used on automobiles, motor boats or aeroplanes.

The main object of the invention is to provide a readily attachable electric tester comprising a plurality of switches arranged in such a manner that they may be operated singly or collectively with greatest ease to test one or all of the cylinders of an engine.

By the use of this improved testing instrument troubles may be immediately located in spark plugs, spark coils, distributor, circuit breaker, high tension wiring, carbureter adjustment, leaks in valves or pistons, and knocks in engine.

Extensive tests of this device have proved its reliability, practicability and usefulness in connection with automobile engines for finding out which cylinder is misfiring or where compression is weak, as well as other troubles which otherwise are difficult to locate and only after long and tedious search.

The preferred construction of this instrument is illustrated in the accompanying drawings—

Figure 1 is a side elevation of the instrument attached to a spark plug on an automobile engine;

Figure 2 is another side elevation of the instrument on a larger scale;

Figure 3 is a section on the line 2—2 of Figure 4;

Figure 4 is a top plan view of the instrument;

Figure 5 is a perspective view of one detail of the device;

Figure 6 is also a perspective view of other details of the device; and

Figure 7 is a fragmentary side elevation of the contacting elements.

This testing instrument consists of a housing 10 comprising a top 11 and a bottom 12 spaced therefrom by blocks 13, these parts being made of insulating material and held rigidly together by means of bolts 14 running through the blocks 13. Along one side of the housing is secured a board 15 of insulating material upon which is arranged a number of resilient contact fingers 16 secured thereon by means of a pair of bolts 17, as best seen in Figures 3 and 4. These fingers 16 extend to within a short distance of the opposite side of the housing 10 and are constructed to be raised above the frame, as shown in Figure 3.

A narrow tongue 18 is formed at the free end of each of the fingers 16 and over which rides a latch 19 adapted to limit the upward deflection of the fingers 16. This latch is fulcrumed, as at 20, on the bracket 21 bolted or riveted to the top 11 of the housing, as indicated at 22. The latch 19 is held in retracted position by means of a spring 23 against the end wall 24 of a slot formed in the top 11 for each latch. The latch is provided with a notch 25 adapted to engage with the shoulders 26 formed at the junction of the tongue 18 with the finger 16 and this notch 25 is so positioned that it will engage with these shoulders only when the fingers 16 are in the compressed position, as indicated by the dotted lines in Figure 3. Between the fingers 16 and the board 15 is inserted a metallic plate 28 to which is secured a conductor 29 terminating with the clip for grounding the circuit at any suitable place on the engine.

Beneath the free end of each tongue 18 is positioned an electrode 30 secured in position by means of a bolt 31 running through the insulating top 11 and securing underneath the same a conductor or cable 32 which is also held securely in position by means of clamps 33 in the housing. As best seen in Figure 3, a gap is formed between the electrode 30 and the tongue 18 when the finger 16 stands in its free or open position, as indicated by full lines in Figure 3, but when depressed by hand or engaged by the notch 25 on the latch 19, the tongue 18 contacts with the electrode bolt head 31, as indicated in dotted lines in Figures 3 and 7.

Beneath the fingers 16 and parallel with the sides of the housing 10 is revolubly mounted therein a shaft 34 upon which are secured eccentrics 35, one for each of the fingers. In Figure 4 are shown eight fingers and tongues each above one of the eccentrics 35. With the eccentrics shown hanging down in their lowermost position, as seen in Figure 3, the tongue 18 of each finger is resting on the upper face of the eccentric when in contacting position with the electrode 30. By turning the shaft 34 one hundred and eighty degrees, that is, with its longer radius of the eccentric pointing in an upward direction, the finger 16 is deflected to its uppermost position and the greatest gap formed between the same and the electrode 30. On the shaft 34 is rigidly secured, near one end of the frame, a ratchet wheel 36 with which engages a spring dog 37 secured on the housing and adapted to rigidly hold the wheel and the shaft 34 in any adjusted position. The teeth of the ratchet wheel are graduated and the relation between the eccentrics 35 and the ratchet wheel 36 is such that the distance between each of the teeth represents a perpendicular rise of the tongue 18 of one hundredth of an inch. By means of this arrangement, it will now be evident that the adjustment of the gap between the tongue 18 and the electrode 30 can be adjusted in steps of one hundredth of an inch. At the end of the shaft 34 is provided a hand wheel 38 for turning the shaft during adjustment.

Referring particularly to Figures 1 and 5, a clip 39 which is used for all the cables 32 as well as for the ground conductor 29 comprises a pair of levers 40, 41 of insulating material. These levers are united by means of a clamp plate 42 which is preferably stamped out of sheet material, as best seen in Figure 5, consisting of a pair of arms 43 extending upwardly and united by a band 44 which is bent on its central line so that the arms 43 will take the position opposite to each other and in this manner embrace both of the levers 41 and 40. The arms 43 are riveted to the fixed lever 41, as at 45, and between the free ends of these arms the lever 40 is pivoted, as at 46. The upper ends of the levers 41 and 40, as seen in Figure 1, form handles which are kept apart by means of a spring 47 inserted between them and the lower ends constitute gripping jaws 48 adapted to grip the spark plug 49 or any other part included in an electric circuit to be tested. The portion 50 of the plate 42 constitutes a clamp for the cable 32 which is rigidly secured therein by means of the screw 51. The bent metallic end of the cable is held in position on the lever 41 by means of the screw 52 which also attaches the conductor 53 to this arm. In this manner, when the clip is placed on the spark plug 49, for instance, electric contact will be formed therewith through the conductor 53 and the cable 32.

The use of the device is as follows: In testing the circuit on a six cylinder engine, an instrument preferably having six fingers 16 is used. This instrument is placed in any convenient position for observance, as for instance, on top of the fender of the automobile, and the clip 39 on the conductor 29 is secured on any suitable part of the engine for grounding. The clips 39 of the testing cables 32 are thereupon secured one on each of the spark plugs of the cylinders and in the same order as the fingers 16 of the testing instrument. The engine is now started to run at an idling speed and the hand wheel 38 is turned sufficiently to permit the fingers to be depressed to obtain the gap desired between the ends of the tongues 18 and their corresponding electrodes 30. The gaps should be the same or slightly less than that provided for each spark plug in the engine. In case the gap formed between an electrode 30 and a finger 16 is the same as that of its spark plug, the spark would jump the gap in the testing instrument in preference to that of the spark plug on account of its being easier to do this as the compression in the cylinders increases resistance in the spark plug gap. If the spark appears at each electrode 30 in the instrument, this would indicate that each plug is in good condition and not dirty and that the insulation of the plug is good and also that the electrodes of the plug are not too close together. Should, on the other hand, no spark appear at the electrodes in the instrument, this would indicate that there is something wrong with the plug or that insufficient current is being delivered to the plug by the spark coil, or else that bad insulation is to be found for the spark. It may also indicate a cracked or dirty distributor cap; or that the circuit breaker is not breaking the circuit; or that the trouble in the spark plug might be caused by cracked porcelain; or that the plug is short circuited on account of carbon deposit, or lastly, that the plug points are too close together.

If the hand wheel 38 is turned to permit a gap at the electrodes 30 of, for instance, one tenth ($\frac{100}{1000}$) of an inch or any desirable width of gap found to be the correct one for the particular test, then the test for each individual cylinder is done by depressing the tongue 18 of the corresponding contact finger 16, one contact at a time. Observation is then made to find whether a spark appears at the particular gap, and, if it does, this would indicate that the spark plug gap is too wide because the spark finds an easier path through the gap in the tester than through the gap in the plug.

When making the first test mentioned above for dirty or bad spark plugs, if no spark appears at the gap on the testing instrument for cylinder 3, for instance, this plug should be examined. If it is found to be good, then test should be made of the spark plug wire. If that wire is good, the distributor cap should be tested in a similar manner and so on.

In order to make this test, the spark plug wire is disconnected from the plug and connected to the clip 39 of the testing instrument and if no spark then appears at the gap of the tester or if it should be very weak, this would prove that the trouble was not in the plug. The spark plug wire is then disconnected from the distributor and the cable 32 through the intermediary of its clip 39 is connected to the terminal of the distributor and the test repeated as before. If a strong spark appears at the gap in tester that would prove that the trouble is in spark plug wire between the distributor and the spark plug. If no spark or very weak spark appears when this test is made, this then indicates that the trouble is to be found in the distributor or circuit breaker, possibly consisting in a crack in the distributor or in dirty distributor allowing current to leak to the ground. It may also indicate a worn circuit breaker cam which would cause circuit breaker points not to break or make contact in the circuit.

It will be evident that the instrument need not be provided with eight contact fingers 16, as shown in Figure 4, but may be provided with four of these fingers in which case the instrument is particularly suitable for a four cylinder engine. This will, however, not prevent its use on another engine having six or eight cylinders as naturally four at a time may be tested so, for instance, on a six cylinder engine, using a four contact finger instrument, cylinders 1, 2, 3 and 4 are first tested and then the instrument shifted using two of the fingers for testing the other two cylinders.

The use of the instrument is like or similar to operating the keys on a piano and, for an instrument having only four of these contact fingers, one hand will be sufficient for operating any or all of the fingers or keys, while an instrument having eight keys will require both hands for operating. A six cylinder engine may, however, be tested by the use of only one hand.

With the instrument connected as described above; that is to say, with the clips 39 of the cables 32 clamping corresponding spark plugs in the engine, fingers 16 for cylinders Nos. 2 to 6 inclusive may all be depressed to make contact with their respective electrodes 30, in this manner short-circuiting the corresponding cylinders, leaving cylinder 1 free to fire if it is in good condition, while the engine is running slowly or slightly faster than normal idling speed. Supposing now that the spark plug for cylinder No. 1 is not clean and is consequently misfiring when all the other cylinders are cut out, the engine would then slow down and stop. Just before stopping, however, the contact fingers previously depressed should all be released when the engine will be brought back to the same speed as before. If thereupon fingers corresponding to cylinders Nos. 1, 3, 4, 5 and 6 are depressed, leaving the finger for cylinder 2 free, and supposing that this cylinder is firing good, then the engine will slow down but continue to run being driven by No. 2 cylinder alone. If now No. 3 cylinder is tested in a similar manner by depressing all the other fingers and supposing that the explosions appear as strong as those of No. 2 cylinder, but that it occasionally misses fire, then the engine will slow down more than it did with cylinder No. 2 and will probably stop unless assisted by releasing one or more of the depressed fingers, thereby prmitting other cylinders to restore the speed of the engine. This last-mentioned test of the cylinder No. 3 would then indicate spark plug trouble.

Supposing in testing cylinder No. 4 in a similar manner that firing continues at all strokes and that the engine slows down gradually, but continues to run when assisted by one or more of the other cylinders after releasing the depressed fingers, this would indicate leaky valves or rings. This will also be indicated by weak explosions as compared with other cylinders, especially No. 2, as described above. The fact that No. 4 slows down to a stop without misfiring will not necessarily mean leaky compression, except for the fact that No. 2 would continue to run without stopping and with the same throttle opening on which No. 4 slows down to stop. The operation of these two cylinders may be readily compared by getting all cylinders out except No. 2 and allowing it to run a few strokes alone, and by thereupon cutting in No. 4 and cutting out No. 2 cylinder and allowing the engine to run until it is about to stop and thereupon assisting it with another cylinder, for instance, No. 2.

This comparison of cylinder operation requires only a few seconds and can be done repeatedly until the operator is satisfied with the results.

Supposing now that No. 5 cylinder is tested and is found to run the engine faster than No. 2 cylinder, this would indicate that No. 2 cylinder has slightly leaky compression or that its compression is not quite as good as that on No. 5. If now testing No. 6 shows it to act in the same manner as No. 5, then a test with open throttle is made on each cylinder to indicate any trouble which would only appear on a heavy pull, such as with cracked or defective porcelain or too wide spark gaps or too weak spark from coil. The cylinders showing a leaky compression in the first test are now tested with open throttle to determine if leak is to be found in the valves or the rings. Thus, with No. 4 running alone and with open throttle if the leak indicated in the first test of this cylinder was in the rings, then smoke would now issue from the breather pipes. But if No. 4 in the first test slowed down considerably and then began misfiring, this would have indicated a leaky intake valve because the burned gases, leaking back into the intake manifold, weaken the mixture to a point where it fails to fire regularly.

It should here be noted, that the relative position between the tongue 18, electrode 30 and securing bolt 31 is such that the tongue only makes direct contact with the head of bolt 31 and that a gap is always formed between the tongue 18 and the electrode 30. For this reason, the rear end of each of the fingers 16 is provided with slots 60 for the bolts 17, permitting longitudinal adjustment of the tongue 18 with regard to its electrode 30. This adjustment should be made, so that the gap does not begin to widen between the tongue 18 and the electrode 30 until the tongue has been raised about twenty thousandths ($\frac{20}{1000}$) of an inch above the head of the bolt 31. From this point on, the gaps between the tongue 18 and bolt 31 will be wider than that between the tongue and the electrode 30. Accordingly, the spark will then jump between the tongue 18 and electrode 30, over the narrower gap, where the operator can more easily observe it; whereas, if the conditions were reversed, the operator would be unable to see a spark jumping to the bolt 17.

Having thus described the invention, what is claimed as new is:

1. An electric tester of the class described comprising a housing, switches mounted therein, a common ground connection for the switches, an individual conductor for each switch, a member adapted to connect said conductor in a circuit to be tested, each switch including a resilient contact element, an electrode spaced therefrom to normally form a gap therewith, and means for adjusting said gap and an element adapted to secure said means in adjusted position.

2. An electric tester of the class described comprising a housing, switches mounted therein, a common ground connection for the switches, an individual conductor for each switch, a member adapted to connect said conductor in a circuit to be tested, each switch including a resilient contact element, an electrode spaced therefrom to normally form a gap therewith, means for adjusting said gap and an element adapted to lock said means in adjusted position, said means including a shaft revolubly mounted in the housing, and an eccentric for each resilient contact element rigidly secured on the shaft.

3. An electric tester of the class described comprising a housing, switches mounted therein, a common ground connection for the switches, an individual conductor for each switch, a member adapted to connect said conductor in a circuit to be tested, each switch including a resilient contact element, an electrode spaced therefrom to normally form a gap therewith, means for adjusting said gap, said means including a shaft revolubly mounted in the housing, an eccentric for each resilient contact element rigidly secured on the shaft, and a locking device adapted to adjustably secure said shaft in different angular position.

4. An electric tester of the class described comprising a housing, switches mounted therein, a common ground connection for the switches, an individual conductor for each switch, a member adapted to connect said conductor in a circuit to be tested, each switch including a resilient contact element, an electrode spaced therefrom to normally form a gap therewith, a latch adapted to engage said resilient contact element to close said gap, means for adjusting said gap, said means including a shaft revolubly mounted in the housing, an eccentric for each resilient contact element rigidly secured on the shaft, and a locking device adapted to adjustably secure said shaft in different angular positions.

In testimony whereof I affix my signature.

MORDAUNT E. PITTMAN. [L. S.]